United States Patent [19]

Aihara

[11] 4,389,684
[45] Jun. 21, 1983

[54] MOVABLE TAPE-GUIDE CONTROL SYSTEM

[75] Inventor: Toshiharu Aihara, Hino, Japan

[73] Assignee: Hitachi Denshi Kabushiki Kaisha, Tokyo, Japan

[21] Appl. No.: 239,889

[22] Filed: Mar. 3, 1981

[30] Foreign Application Priority Data

Mar. 6, 1980 [JP] Japan ................................. 55-27288

[51] Int. Cl.³ ...................... G11B 15/32; G11B 17/00; G11B 19/02
[52] U.S. Cl. ................................... 360/71; 360/130.22
[58] Field of Search ................. 360/71, 73, 74.1, 74.2, 360/84–85, 130.21, 130.22, 130.23

[56] References Cited

U.S. PATENT DOCUMENTS

| | | | |
|---|---|---|---|
| 3,388,221 | 6/1968 | Johnson | 360/83 |
| 3,831,198 | 8/1974 | Kihara et al. | 360/85 |
| 4,249,222 | 2/1981 | Iwasaki | 360/130.23 |

FOREIGN PATENT DOCUMENTS

| | | | |
|---|---|---|---|
| 53-66204 | 6/1978 | Japan | 360/71 |
| 55-52552 | 4/1980 | Japan | 360/71 |
| 1525346 | 9/1978 | United Kingdom | 360/71 |
| 670971 | 6/1979 | U.S.S.R. | 360/71 |

Primary Examiner—John H. Wolff
Attorney, Agent, or Firm—Oblon, Fisher, Spivak, McClelland & Maier

[57] ABSTRACT

A movable tape-guide control system for a helical scan type magnetic recording and reproduction apparatus, which control system is capable of detecting the time when an end portion of the magnetic tape will pass over a rotary head drum during the rewinding of the magnetic tape, and moving a guide post for guiding the magnetic tape from the rotary head drum before the end portion of the magnetic tape passes between the guide post and the rotary head drum, whereby jamming of the magnetic tape between the guide post and the rotary head drum is prevented and accordingly damage to the video head by the jammed magnetic tape or the end portion thereof is prevented. The advanced detection of the end portion of the magnetic tape is performed by monitoring when the running speed of the magnetic tape increases in comparison with the rotation speed of the magnetic tape reel by a predetermined ratio.

5 Claims, 1 Drawing Figure

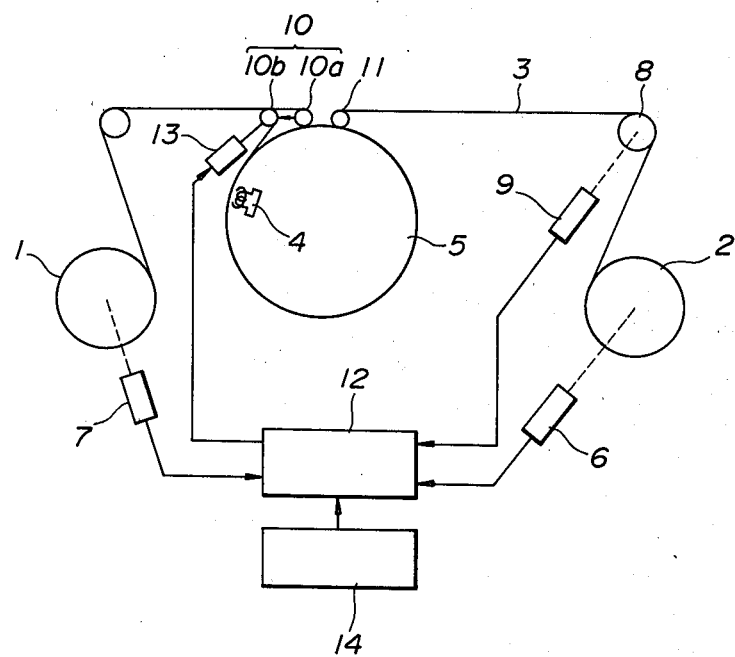

MOVABLE TAPE-GUIDE CONTROL SYSTEM

BACKGROUND OF THE INVENTION

The present invention relates to a control system for controlling a movable tape-guide post in an Ω winding helical scan type magnetic recording and reproduction apparatus.

A variety of magnetic recording and reproduction apparatuses, the so-called VTR's, for handling broad band signals such as video signals have been proposed for practical use, varying in the methods of forming recording tracks on the magnetic tape.

Recently, an Ω winding helical scan type VTR (hereinafter referred to as the H-VTR), which has been employed only as a simple VTR for private use, has begun to attract attention with respect to the possibility of its business or broadcasting applications after SMPTE's consent to the use of a type C format.

The H-VTR has various advantages over other conventional video tape recorders, but at the same time, it has the following shortcomings: Extremely high accuracy is required for the registration of the magnetic tape on the head drum. Moreover, it is required that an extremely small gap between a tape guide post and the head drum, for example, a gap of 0.2 mm, be maintained. In the conventional H-VTR, there is a risk that, if the end portion of the magnetic tape is folded or is damaged during the rewinding of the magnetic tape, it will be jammed between the head drum and a guide post which is disposed along the tape path immediately after the passage of the tape (in rewind) around the drum. When this takes place, the magnetic head disposed in the head drum is damaged by the end portion of the magnetic tape. Even if the end portion of the magnetic tape does not get jammed in the gap between the guide post and the head drum, the magnetic head is likely to be damaged by the end portion of the magnetic tape, if it has a bent or damaged portion, when the magnetic tape passes through the gap. For this reason, damage to the magnetic head or troubles of the above-mentioned sort are apt to take place in the conventional H-VTR.

SUMMARY OF THE INVENTION

It is therefore an object of the present invention to provide a movable tape-guide control system for the H-VTR, which is capable of preventing any damage to the magnetic head by the magnetic tape, which may take place during the rewinding of the magnetic tape, whereby shortcomings of the conventional video tape recorders have been eliminated.

In order to attain this object in the present invention, when the running of the magnetic tape is initiated, the end portion thereof is detected before it comes between the guide post and the head drum, and the guide post is moved away from the head drum in advance.

BRIEF DESCRIPTION OF THE DRAWINGS

The single FIGURE is a schematic diagram of an embodiment of a movable tape-guide control system according to the present invention.

DETAILED DESCRIPTION OF THE PREFERRED EMBODIMENT

Referring to the single FIGURE, there is shown an embodiment of a movable tape-guide control system according to the present invention. In the FIGURE, reference numeral 1 represents a magnetic tape feed reel; reference numeral 2, a magnetic tape take-up reel; reference numeral 3, a magnetic tape; reference numeral 4, a magnetic head (video head); reference numeral 5, a rotary head drum; reference numeral 6 and 7, tachometers for detecting the rotation speeds of the reel 2 and reel 1, respectively; reference numeral 8, an idler (timer roller); reference numeral 9, a timer tachometer for detecting the rotation speed of the idler 8; reference numeral 10, a magnetic tape input-side guide post; reference numeral 11, a magnetic tape output-side guide post; reference numeral 12, a tape end detector; reference numeral 13, a guide post drive apparatus; and reference numeral 14, an operation mode setting apparatus.

The operation of the movable tape-guide control system is as follows:

The guide post drive apparatus 13 is actuated by a control signal generated from the tape end detector 12 and controls the guide post 10 so as to position the same at a position indicated by reference numeral 10a in the FIGURE when the magnetic tape is normally running. The guide post 10 and guide post 11 are thus positioned in such a manner that the magnetic tape 3 is wound around the rotary head drum 5, following a predetermined path thereon.

The reel tachometers 6 and 7 detect the rotation speeds of the reels 2 and 1, respectively, and input the electric signals indicating the detected rotation speeds to the tape end detector 12.

Likewise, the timer tachometer 9 detects the rotation speed of the idler 8, which is rotated by the running of the magnetic tape 3, and inputs an electric signal indicating the detected rotation speed to the tape end detector 12.

When tape rewinding mode is set by the operation mode setting apparatus 14 and rewinding is initiated, the electric signals, output from the tachometers 6, 7 and 9, are processed by the tape end detector 12, and the state is detected in which the end portion of the magnetic tape 3 is moving away from the reel 2 and the completion of rewinding the magnetic tape 3 is close at hand. This detecting operation is performed as follows: The signal indicating the tape running speed, which is output from the timer tachometer 9, is compared with the signal indicating the rotation speed of the reel 2, which is output from the tachometer 6. When the comparison indicates that the rotation speed of the reel 2 increases in comparison with the running speed of the magnetic tape 3 and their speed ratio amounts to a predetermined value or exceeds the same, it is judged that the departure of the end portion of the magnetic tape 3 from the reel 2 is close at hand.

When the end portion of the magnetic tape 3 is thus detected, a control signal is produced from the tape end detector 12 and is input to the guide post drive apparatus 13. The guide post drive apparatus 13 moves the guide post 10 from the position 10a to the position 10b, increasing the space between the guide post 10 and the rotary head drum 5.

Because of the above-mentioned structure, when the end portion of the magnetic tape 3 leaves the reel 2, passes over the idler 8, the guide post 11, the peripheral surface of the rotary head drum 5, and then through the space between the guide post 10 and the rotary head drum 5, even if the end portion of the magnetic tape 3 is bent or damaged, jamming of the magnetic tape 3 between the guide post 10 and the rotary head drum 5 is avoided since there is a sufficient space for allowing the bent or damaged end portion of the magnetic tape 3 to pass therethrough. Accordingly, damage to the magnetic head 4 by the magnetic tape 3 does not take place.

When an other operation mode is set by the operation mode setting apparatus 14, the above-mentioned control function of the tape end detector 12 is stopped and the guide post drive apparatus 13 is controlled by an other control system, so that the guide post 10 is moved to the position 10a or to the position 10b by the guide post drive apparatus 13 as desired.

In the above-mentioned embodiment of a movable tape-guide control system according to the present invention, when the end portion of the magnetic tape 3 passes between the guide post 10 and the rotary head drum 5 during the rewinding of the magnetic tape 3, the guide post 10 is moved to the position 10b and the space between the guide post 10 and the rotary head drum 5 is increased. Therefore, even if the end portion of the magnetic tape 3 is bent or damaged, that portion is not jammed between the guide post 10 and the rotary head drum 5 and accordingly damage to the magnetic head 4 by the jammed portion of the magnetic tape 3 can be prevented.

High accuracy is required for the location of the guide posts 10 and 11. Therefore, with respect to the drive mechanism for the guide post 10, it is required that the drive mechanism be capable of positioning the guide post 10 with consistent accuracy in the repeated operation thereof. Such a movable guide apparatus capable of attaining the above-mentioned consistency has been proposed in U.S. patent application Ser. No. 173,275/1980 filed by the applicant of the present invention. Therefore, the present invention has been sufficiently reduced to practice.

Moreover, when such a movable guide apparatus as is disclosed in that U.S. patent application is applied to the guide post 10 or the guide post 11 or to both of them, the loading or unloading of the magnetic tape 3 can be simplified.

What is claimed is:

1. A movable tape-guide control system for a helical scan type magnetic recording and reproduction apparatus capable of guiding a magnetic tape relative to a rotary head drum by use of a pair of guide posts, comprising:

magnetic tape reel rotation speed detection means for producing a signal indicating the rotation speed of a magnetic tape reel;

magnetic tape running speed detection means for producing a signal indicating the running speed of a magnetic tape;

control signal generation means for detecting the approach of the end portion of said magnetic tape towards said guide posts based on said signal indicating the rotary speed of said magnetic tape reel and on said signal indicating the running speed of said magnetic tape, and for producing a control signal; and guide post drive means for moving at least one said guide post for guiding said magnetic tape to a predetermined position in accordance with said control signal generated from said control signal generation means, whereby said guide post is moved away from said rotary head drum by a predetermined distance so as to increase the space therebetween when said end portion of the magnetic tape comes near said guide post.

2. A movable tape-guide control system as claimed in claim 1, wherein said magnetic tape reel rotation speed indication means comprises a reel tachometer, and said magnetic tape running speed indication means comprises a timer tachometer.

3. A movable tape-guide control system as claimed in claim 1, wherein said control signal generation means comprises a comparison means for comparing said signal indicating the rotary speed of said tape reel for said magnetic tape and said signal indicating the running speed of said magnetic tape, and generating said control signal only when the value of said signal indicating the rotary speed of a tape reel for said magnetic tape exceeds the value of said signal indicating the running speed of said magnetic tape by a predetermined amount.

4. A movable tape-guide control system as claimed in claim 1, wherein said guide post drive means is connected to a guide post which is located on the side of said rotary head drum from which said magnetic tape is caused to travel out of, when said magnetic tape is rewound.

5. A movable tape-guide control system as claimed in claim 1, wherein said guide post drive means is connected to each of said guide posts.

* * * * *